US011718222B2

(12) United States Patent
Groben et al.

(10) Patent No.: US 11,718,222 B2
(45) Date of Patent: Aug. 8, 2023

(54) AIR VENT FOR A MOTOR VEHICLE

(71) Applicant: ILLINOIS TOOL WORKS INC., Glenview, IL (US)

(72) Inventors: Manfred Groben, Gau-Bickelheim (DE); Harald Noichl, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/072,221

(22) Filed: Nov. 30, 2022

(65) Prior Publication Data

US 2023/0166655 A1 Jun. 1, 2023

(30) Foreign Application Priority Data

Dec. 1, 2021 (DE) ..................... 10 2021 131 667.7

(51) Int. Cl.
*B60Q 3/20* (2017.01)
*B60Q 3/60* (2017.01)
*F21V 8/00* (2006.01)
*B60H 1/34* (2006.01)

(52) U.S. Cl.
CPC ............. *B60Q 3/20* (2017.02); *B60H 1/3442* (2013.01); *B60Q 3/60* (2017.02); *G02B 6/0008* (2013.01)

(58) Field of Classification Search
CPC .......... B60Q 3/20; B60Q 3/60; B60H 1/3442; G02B 6/0008
See application file for complete search history.

(56) References Cited

U.S. PATENT DOCUMENTS

2009/0298406 A1* 12/2009 Norbury, Jr. ............. B60Q 3/80
454/145

FOREIGN PATENT DOCUMENTS

| DE | 20118014 U1 | 1/2002 | |
|---|---|---|---|
| DE | 102010036691 A1 | 3/2011 | |
| DE | 102011110265 U1 | 4/2012 | |
| DE | 102015115365 A1 * | 3/2017 | ........... B60H 1/3414 |
| DE | 102019003359 A1 | 11/2020 | |
| DE | 102019003366 A1 | 11/2020 | |
| EP | 3156272 A1 * | 4/2017 | ........... B60H 1/3435 |

(Continued)

OTHER PUBLICATIONS

Machine translation of WO2020229166 (Year: 2020).*
Machine translation of DE102015115365 (Year: 2017).*
Machine translation of EP 3156272 (Year: 2017).*

*Primary Examiner* — Leah Simone Macchiarolo
(74) *Attorney, Agent, or Firm* — Thompson Hine LLP

(57) ABSTRACT

An air vent for a motor vehicle includes a housing having an insert rotationally and/or pivotably supported in the housing about a bearing system with at least one assembly for guiding and/or deflecting a supplied air flow, and an element arranged centrally in the insert. The element is connected to the assembly for guiding and/or deflecting a supplied air flow. The bearing system is arranged on the central longitudinal axis of the housing and is carried out by a bearing. An optical fiber is accommodated in the bearing. For the at least regional lighting of the air vent, at least one light source is arranged in the housing on the central longitudinal axis upstream of the bearing system, such that the light emitted by the at least one light source is at least partially couplable, as needed, into the first optical fiber via a photometric coupling in the bearing.

15 Claims, 6 Drawing Sheets

(56) References Cited

FOREIGN PATENT DOCUMENTS

| EP | 3812185 A1 | * | 4/2021 | ............... | B60H 1/34 |
| WO | WO-2020229166 A1 | * | 11/2020 | ........... | B60H 1/3435 |

\* cited by examiner

AIR VENT FOR A MOTOR VEHICLE

TECHNICAL FIELD

The present invention relates to an air vent, in particular for a ventilation system of a motor vehicle. Furthermore, the invention relates to a ventilation system having such an air vent as well as a corresponding air vent system.

BACKGROUND

In ventilation apparatuses for vehicles, air vents or air vent nozzles are typically used, which enable the exiting airflow to be controlled in a targeted manner. Such air vents are used in order to supply fresh air, in particular, into a motor vehicle interior.

The airflow flows through an inlet opening at an air inlet region of the air vent into the air duct, which is delimited by the housing wall of the air vent, through said air duct, and ultimately through an outlet opening at the air outlet region of the air vent into the interior of a motor vehicle (for example, a car or truck). The airflow generally follows a main flow direction, which can run in particular at least substantially parallel to a longitudinal axis of the housing of the air vent.

In known air vents, the airflow is deflected from the main flow direction by one or more air guiding elements, for example pivotable air guiding blades or fixed air guiding elements. In addition to the air guiding elements, the housing of the air vent that delimits the air duct can also serve to deflect the air from the main flow direction.

A special design of air vents is in the form of corresponding "ball vents." Here, an air guiding insert arranged in the housing of the air vent is used, wherein the air guiding insert comprises a bearing body that is pivotably supported in the housing in the manner of a ball-and-socket joint. Such ball vents can also optionally comprise an aperture mounted rotatably on the bearing body and a plurality of blades, wherein the blades can be adjusted about a pivot axis arranged radially with respect to the air guiding insert.

In particular, the region of an air vent that is visible from the interior of the motor vehicle, such as, in particular, the air outlet region of the housing, is increasingly used in order to generate attention among consumers and to enhance the overall appearance of the motor vehicle. In particular, the interior furnishing of a motor vehicle is an increasingly distinguishing feature and should be designed in order to create style and ambience as desired by the motor vehicle buyer.

Accordingly, in this context, there is also a need for illumination solutions for vents that integrate harmoniously with the design theme of the motor vehicle cabin.

One of the aspirations among experts in this field is, in particular, to be able to realize a lighting of the interior, and in particular of components of the air vent, that is as unique as possible in a manner that is as easy to realize as possible and without an excessive restructuring of the vents, in order to be able to thus produce, in particular, different styles as desired, all the way from reduction to essentials, through emphasis on athleticism, and up to a luxury ambience. This is based on the finding that a well-designed lighting integrated in a vent conveys the feeling of well-being and establishes a strong emotional connection to the motor vehicle. Furthermore, it improves driving safety at night by illuminating operating elements of the air vent and even indicating hazardous situations, where applicable.

In this context, it is known from the prior art to equip air vents with corresponding lighting devices for backlighting regions of the air vent. For example, in order to enable the operation of air vents in the dark, for example when driving at night, it is known to partially light the air vents.

For example, the publication DE 10 2011 110 265 U1 describes a ventilation apparatus for a motor vehicle, wherein the ventilation apparatus comprises a vent nozzle and illuminating means. The illuminating means detects whether the air flow from the vent nozzle can flow into the interior of the motor vehicle.

On the other hand, publication DE 20 118 014 U1 discloses an air nozzle for emitting an air flow out of an air supply shaft. The air nozzle comprises an operating element, which allows the blades of the air nozzle to be adjusted. This operating element comprises a backlit light outlet portion, which, in the dark, indicates the orientation of the operating element and thus the orientation of the air flow.

However, such backlighting or lighting means known from the prior art have the disadvantage that they can usually only be adapted to the buyer's desires with considerable effort. In particular, known lighting solutions for air vents cannot be transferred, or can only be transferred with great technological effort in terms of design and assembly, to air vents embodied, for example, as ball vents.

In summary, the known solutions for lighting components of an air vent offer only limited functionality or a limited light design.

SUMMARY

Based on the explained prior art, the problem addressed by the invention, in particular, is to specify an air vent designed in particular as a ball vent, in which lighting can be implemented in a constructively simple manner and with high flexibility in terms of functionality and light design.

Accordingly, the invention relates in particular to an air vent for a motor vehicle, wherein the air vent comprises a housing having an air inlet region and an air outlet region as well as an insert supported in the housing about a bearing in a rotational and/or pivotable manner, with at least one assembly for guiding and/or deflecting a supplied air flow. The air vent according to the invention further comprises an element arranged centrally in the insert, which element is connected to the at least one assembly for guiding and/or deflecting a supplied air flow.

The bearing system is arranged on the central longitudinal axis of the housing, wherein the bearing system is carried out by means of a bearing. A first optical fiber is at least partially or regionally accommodated in the bearing such that the first optical fiber is rotatable, tiltable, and/or pivotable in the bearing relative to the housing together with the element arranged centrally in the insert.

According to the invention, it is in particular provided that, for at least regionally lighting the air vent, it comprises at least one light source, in particular in the form of an LED. The at least one light source is arranged in the housing on its central longitudinal axis and—when viewed in the main flow direction of the air vent—upstream of the bearing system such that the light emitted by the at least one light source can be at least partially coupled into the first optical fiber in a bearing associated with the bearing system via a photometric coupling.

According to preferred implementations of the air vent according to the invention, it is provided that the at least one light source is associated with a second optical fiber that extends along the central longitudinal axis of the housing and is guided into the bearing approximately at the pivot point of the insert. The first optical fiber is in particular guided into the bearing from the side opposite the second optical fiber.

In this embodiment, it is in particular provided that the light emitted by the at least one light source is at least partially coupled into the second optical fiber, and the second optical fiber couples the light into the first optical fiber.

According to further developments of this implementation of the air vent according to the invention, it is provided that the first optical fiber and the second optical fiber do not touch, but the first optical fiber is configured so as to be convex or concave at the light coupling site. The center of the convex or concave surface thus formed is preferably arranged in the region of a pivot point of an air guiding element of the air vent.

In this context, it is in particular provided that the second optical fiber is preferably configured so as to be planar or even at the light outcoupling site.

Alternatively or additionally, an optical element can be arranged between the first optical fiber and the second optical fiber, in particular in the form of a lens, preferably in the form of a condenser lens.

According to an alternative implementation of the air vent according to the invention, it is provided that the at least one light source is associated with an elongated hollow body for light shielding, which extends along the central longitudinal axis of the housing and is guided into the bearing approximately at the pivot point of the insert. In particular, it is provided that the light emitted by the at least one light source is at least partially coupled into the first optical fiber via the elongated hollow body.

According to further developments of this implementation of the air vent according to the invention, it is provided that the first optical fiber and the elongated hollow body do not touch, but the first optical fiber is configured so as to be convex or concave at the light coupling site.

Alternatively or additionally, an optical element, in particular in the form of a lens, preferably in the form of a collecting lens, can be arranged between the elongated hollow body and the first optical fiber.

According to configurations, it is provided in the air vent according to the invention that the at least one light source is arranged on an elongated carrier, in particular in the form of a printed circuit board, wherein the longitudinal axis of the carrier extends perpendicular or substantially perpendicular to the main direction of flow of the air vent.

In this context, it lends itself that an end region of the carrier facing away from the at least one light source is guided at least regionally out of the housing and comprises a plug-in contact for a power supply.

As an alternative to these configurations, it is provided according to embodiments of the air vent according to the invention that the at least one light source is arranged on an elongated carrier, in particular in the form of a printed circuit board, wherein the carrier runs at least partially obliquely to the main flow direction of the air vent within the housing.

According to further developments of this embodiment, it is provided that an end region of the carrier facing away from the at least one light source is guided at least regionally out of the housing and comprises a plug-in contact for a power supply, and wherein an opposite end region of the carrier is arranged with the at least one light source—compared to the end region of the carrier with the plug-in contact—further downstream of the air vent.

With this configuration, the design length of the air vent can be significantly reduced.

Apart from the actual implementation of the carrier for the at least one light source, it is provided according to further developments that conductor tracks are formed on the carrier, which galvanically connect the at least one light source to the plug-in contact. In this context, it is generally conceivable that the conductor tracks themselves form contact surfaces of the plug-in contact.

According to embodiments of the solution according to the invention, it is provided that a slit opening is formed in the housing, into which the carrier can be inserted.

In embodiments of the air vent according to the invention, it is provided that at least one further light source is arranged on the carrier, in particular in the form of an LED, wherein the at least one further light source is associated with an optical fiber system, in which the light emitted as needed by the at least one further light source is at least partially couplable.

It is conceivable, for example, that the optical fiber system comprises an in particular annular region that at least regionally surrounds the insert of the air vent.

According to a further aspect of the present invention, the problem underlying the invention is solved by an air vent comprising a housing having an air inlet region and an air outlet region and an insert supported in the housing about a bearing in a rotational and/or pivotable manner, with at least one assembly for guiding and/or deflecting a supplied air flow, wherein the air vent further comprises an element arranged centrally in the insert, which element is connected to the at least one assembly for guiding and/or deflecting a supplied air flow. The bearing system is arranged on the central longitudinal axis of the housing, wherein the bearing system is carried out by means of a bearing. A first optical fiber is at least partially or regionally accommodated in the bearing such that the first optical fiber is rotatable, tiltable, and/or pivotable in the bearing relative to the housing together with the element arranged centrally in the insert.

In the further aspect of the present invention, it is particularly provided according to the invention that, for the at least regional lighting of the air vent, it comprises at least one light source, in particular in the form of an LED, which is arranged on the housing, in particular outside the housing, wherein the at least one light source is associated with a second optical fiber, which runs obliquely to the central longitudinal axis of the air vent such that the light emitted by the at least one light source is at least partially couplable into the second optical fiber and couplable by the latter into the first optical fiber.

According to further developments of this aspect according to the invention, it is provided that the second optical fiber is associated with an elongated hollow body for light shielding, which extends along the central longitudinal axis of the housing and is guided into the bearing approximately at the pivot point of the insert. The light emitted by the at least one light source and coupled into the second optical fiber is at least partially coupled into the first optical fiber via the elongated hollow body.

According to further developments of this embodiment of the air vent according to the invention, it is provided that the first optical fiber and the elongated hollow body do not touch, but the first optical fiber is configured so as to be convex or concave at the light coupling site.

Alternatively or additionally, an optical element can be arranged between the elongated hollow body and the first and/or second optical fiber, in particular in the form of a lens, preferably in the form of a condenser lens.

BRIEF DESCRIPTION OF THE DRAWINGS

Exemplary embodiments of the air vent according to the invention are described below with reference to the accompanying drawings.

The following are shown.

DETAILED DESCRIPTION

Figure 1:
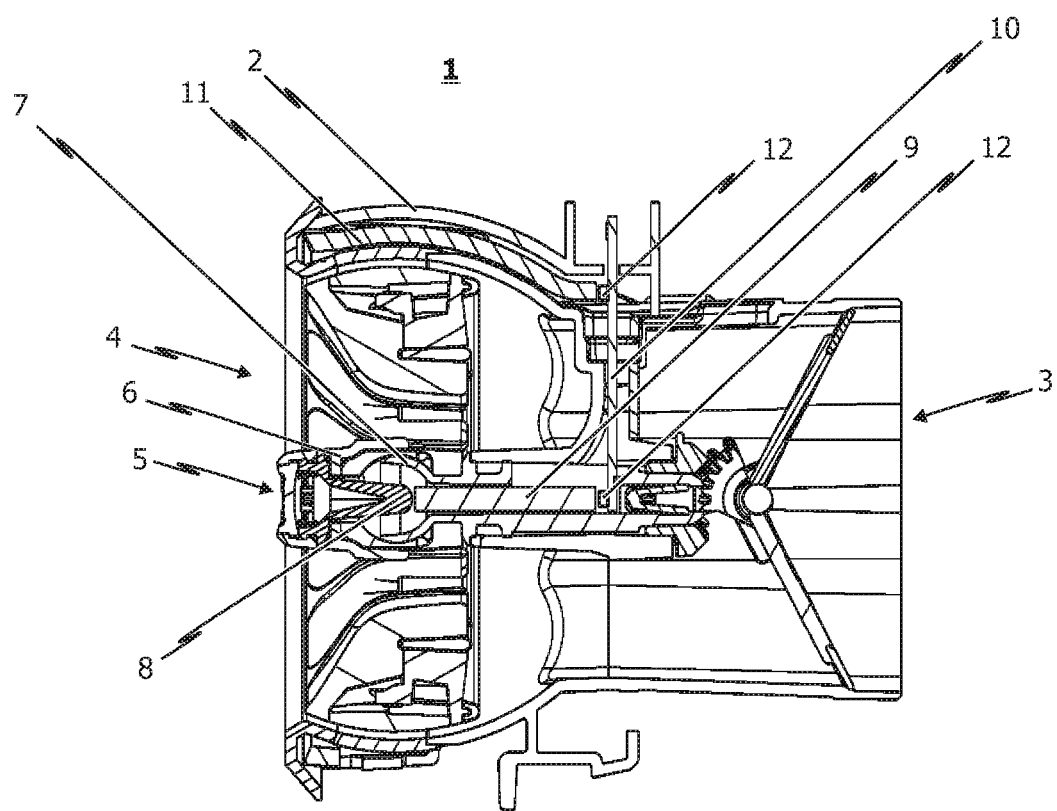
FIG. 1 schematically and in a longitudinal sectional view, a first exemplary embodiment of the air vent according to the invention.

The various exemplary embodiments of the air vent 1 according to the invention shown in the drawings have in common that the air vents 1 each comprise a housing 2 having an air inlet region 3 and an air outlet region 4.

Furthermore, the air vents 1 each comprise an insert 5 rotationally and or pivotally supported in the housing 2 about a bearing system 7, with at least one assembly for guiding and/or deflecting a supplied air flow.

Moreover, the embodiments of the air vent 1 according to the invention have in common that they each comprise an element 6 arranged centrally in the insert 5, which element is connected to the at least one assembly for guiding and/or deflecting a supplied air flow. The bearing system 7 is arranged on the central longitudinal axis of the housing 2, wherein the bearing system 7 is carried out by means of a bearing.

A further commonality of the exemplary embodiments of the air vent 1 according to the invention can be seen in that a first optical fiber 8 is at least partially or regionally accommodated in the bearing such that the first optical fiber 8 is rotatable, tiltable, and/or pivotable in the bearing relative to the housing 2 together with the element 6 arranged centrally in the insert 5.

The embodiments illustrated in FIG. 1 through FIG. 4 have in common that, for the at least regional lighting of the air vent 1, it comprises at least one light source 12, in particular in the form of an LED, which is arranged in the housing 2 on the central longitudinal axis thereof and—when viewed in the main flow direction of the air vent 1—upstream of the bearing system 7, such that the light emitted by the at least one light source 12 is at least partially couplable into the first optical fiber 8 via a photometric coupling in the bearing.

As in the first exemplary embodiment of the air vent 1 according to the invention illustrated in FIG. 1, the at least one light source 12 can be associated with a second optical fiber 9, which extends along the central longitudinal axis of the housing 2 and is guided into the bearing approximately at the pivot point of the insert 5, wherein the first optical fiber 8 is in particular guided into the bearing from the side opposite the second optical fiber 9, and wherein the light emitted by the at least one light source 12 is at least partially coupled into the second optical fiber 9, and the second optical fiber 9 then couples the light into the first optical fiber 8.

In this context, it is provided in particular that the first optical fiber 8 and the second optical fiber 9 do not touch, but the first optical fiber 8 is configured so as to be convex or concave at the light coupling site, wherein the second optical fiber 9 is configured so as to be planar or even at the light outcoupling site.

Although not shown in FIG. 1, an optical element can be arranged between the first optical fiber 8 and the second optical fiber 9, in particular in the form of a lens and preferably in the form of a condenser lens.

Figure 2:
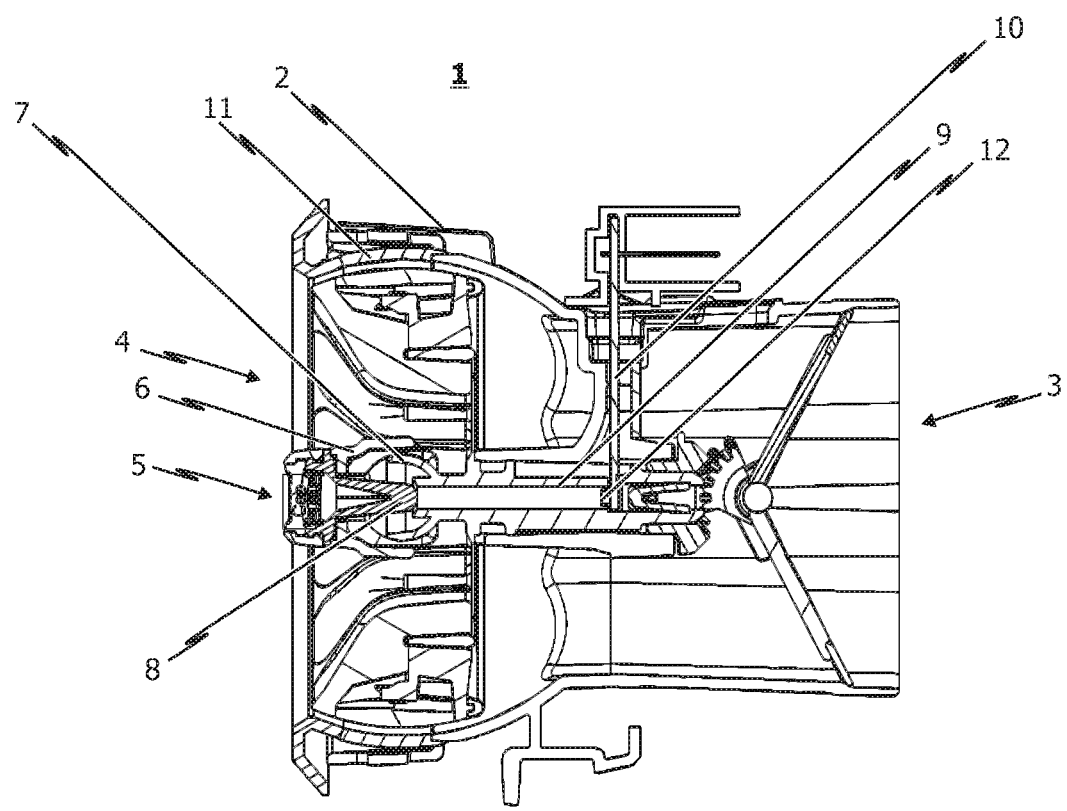
FIG. 2 schematically and in a longitudinal sectional view, a second exemplary embodiment of the air vent according to the invention.

The embodiment of the air vent 1 according to the invention illustrated in FIG. 2 is characterized in that the at least one light source 12 is associated with an elongated hollow body for light shielding, which extends along the central longitudinal axis of the housing 2 and is guided into the bearing approximately at the pivot point of the insert 5, wherein the light emitted by the at least one light source 12 is at least partially coupled into the first optical fiber 8 via the elongated hollow body.

In particular, it is provided that the first optical fiber 8 and the elongated hollow body do not touch, but the first optical fiber 8 is configured so as to be convex or concave at the light coupling site.

Although not shown in FIG. 2, an optical element 6 can also be arranged between the elongated hollow body and the first optical fiber 8, in particular in the form of a lens and preferably in the form of a condenser lens.

The embodiments according to FIG. 1 and FIG. 2 have in common that the at least one light source 12 is arranged on an elongated carrier 10, in particular in the form of a printed circuit board, wherein the longitudinal axis of the carrier 10 extends perpendicular or substantially perpendicular to the main direction of flow of the air vent 1.

It can further be seen in the illustrations in FIG. 1 and FIG. 2 that an end region of the carrier 10 facing away from the at least one light source 12 is guided at least regionally out of the housing 2 and comprises a plug-in contact for a power supply.

Figure 3:
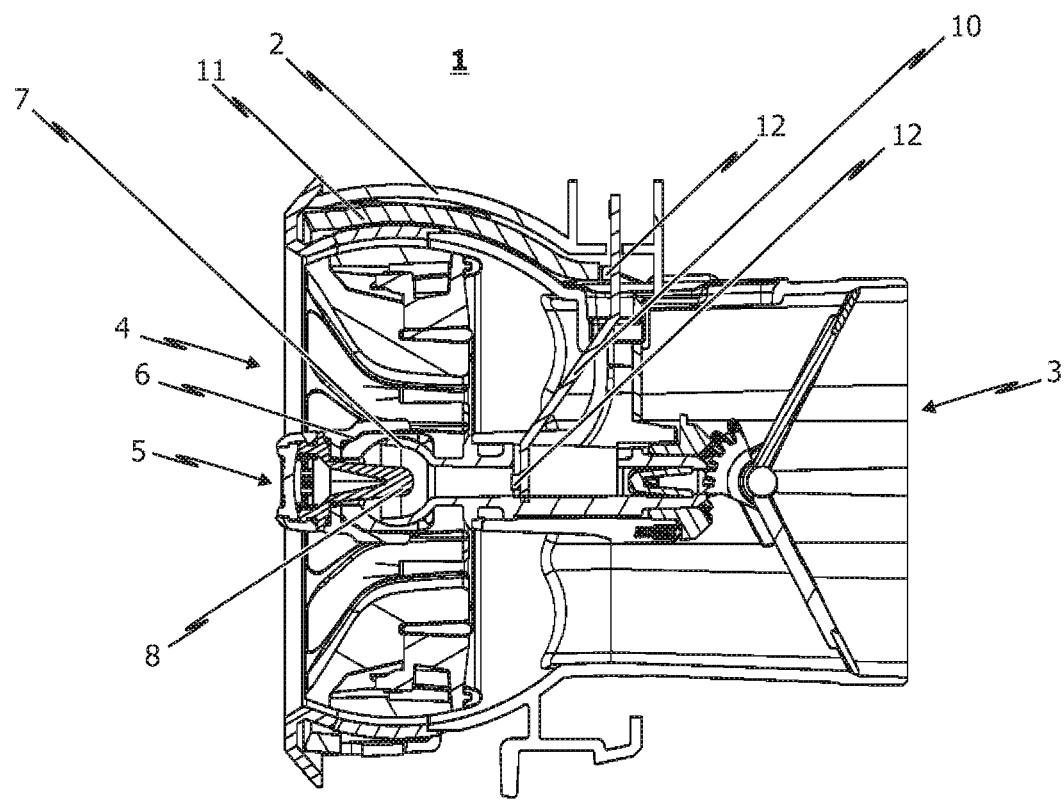
FIG. 3 schematically and in a longitudinal sectional view, a third exemplary embodiment of the air vent according to the invention.
Figure 4:
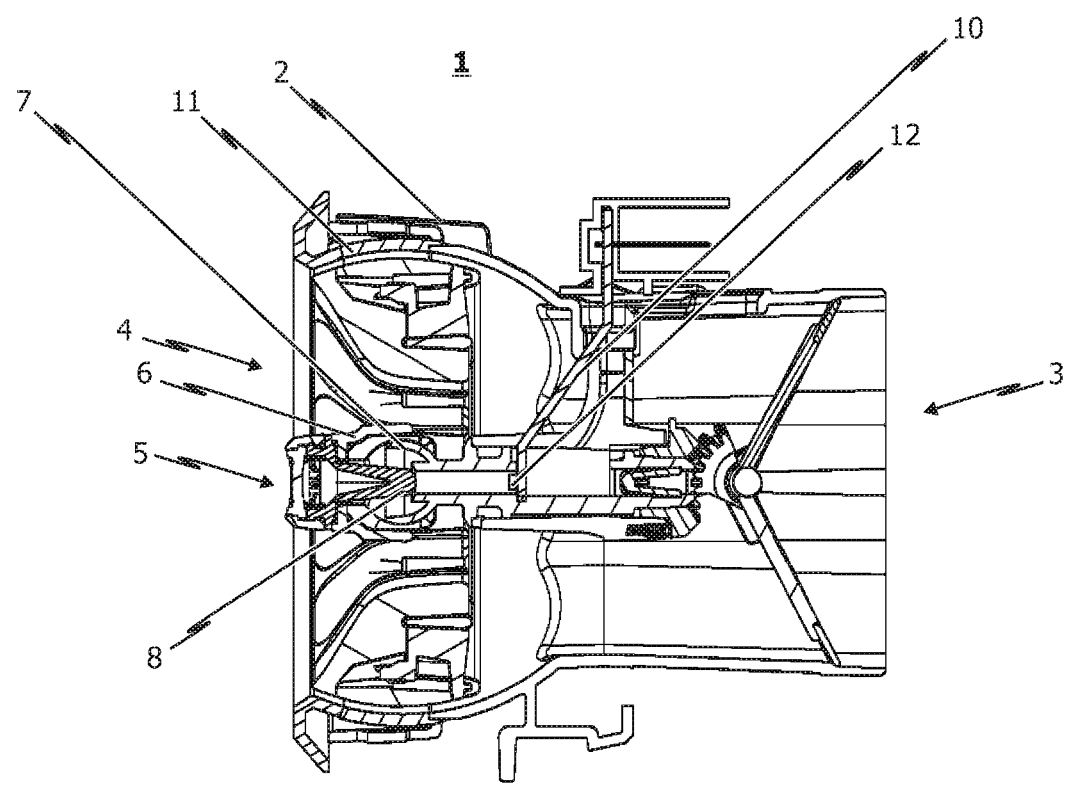
FIG. 4 schematically and in a longitudinal sectional view, a fourth exemplary embodiment of the air vent according to the invention.

In the embodiment shown in FIG. 3 and FIG. 4, on the other hand, the at least one light source 12 is arranged on an elongated carrier 10, in particular in the form of a printed circuit board, wherein the carrier 10 runs at least partially obliquely to the main flow direction of the air vent 1 within the housing 2.

In particular, it is provided here that an end region of the carrier 10 facing away from the at least one light source 12 is guided at least regionally out of the housing 2 and comprises a plug-in contact for a power supply, and wherein an opposite end region of the carrier 10 is arranged with the at least one light source 12—compared to the end region of the carrier 10 with the plug-in contact—further downstream of the air vent 1.

The embodiments shown in FIG. 1 to FIG. 4 have in common that, on the carrier 10 of the at least one light source 12, conductor tracks are formed, which galvanically connect the at least one light source 12 to the plug-in contact of the carrier 10. Here, it is conceivable in particular that the conductor tracks themselves form contact surfaces of the plug-in contact.

Furthermore, the embodiments shown in FIG. 1 to FIG. 4 of the air vent 1 according to the invention have in common that a slit opening is formed in the housing 2 of the air vent 1, into which opening the carrier 10 can be inserted.

For example, as indicated in FIG. 1 and FIG. 3, at least one further light source 12 can be arranged on the carrier 10, in particular in the form of an LED, wherein the at least one further light source 12 is associated with an optical fiber system 11, in which the light emitted as needed by the at least one further light source 12 is at least partially couplable. In this context, it is conceivable in particular that the optical fiber system 11 comprises an in particular annular region that at least regionally surrounds the insert 5 of the air vent 1.

Figure 5:
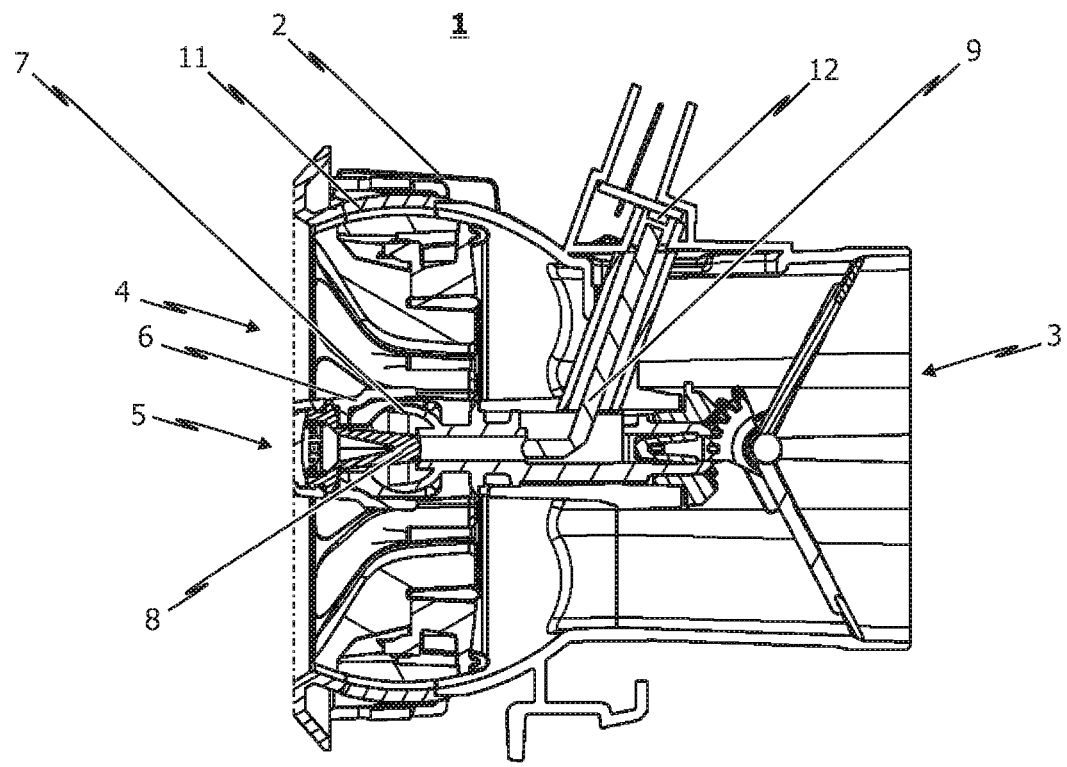
FIG. 5 schematically and in a longitudinal sectional view, a fifth exemplary embodiment of the air vent according to the invention.

In FIG. 5, a further exemplary embodiment of the air vent 1 according to the invention is shown schematically, wherein this further embodiment is characterized in particular in that, for the in particular regional lighting of the air vent 1, it comprises at least one light source 12, in particular in the form of an LED, which is arranged on the housing 2, in particular outside the housing 2, on the edge of the housing 2 (optionally inside or outside), wherein the at least one light source 12 is associated with a second optical fiber 9, which runs obliquely to the central longitudinal axis of the air vent 1 such that the light emitted by the at least one light source 12 is at least partially couplable into the second optical fiber 9 and couplable by the latter into the first optical fiber 8.

It can further be seen in the illustration in FIG. 5 that the second optical fiber 9 can be associated with an elongated hollow body for light shielding, which extends along the central longitudinal axis of the housing 2 and is guided into the bearing approximately at the pivot point of the insert 5, wherein the light emitted by the at least one light source 12 and coupled into the second optical fiber 9 is at least partially coupled into the first optical fiber 8 via the elongated hollow body.

In this context, it should be provided that the first optical fiber 8 and the elongated hollow body do not touch, but the first optical fiber 8 should preferably be configured so as to be convex or concave at the light coupling site.

Although not shown in FIG. 5, it is conceivable in principle that an optical element is arranged between the elongated hollow body and the first optical fiber 8, in particular in the form of a lens and preferably in the form of a condenser lens.

Figure 6A:
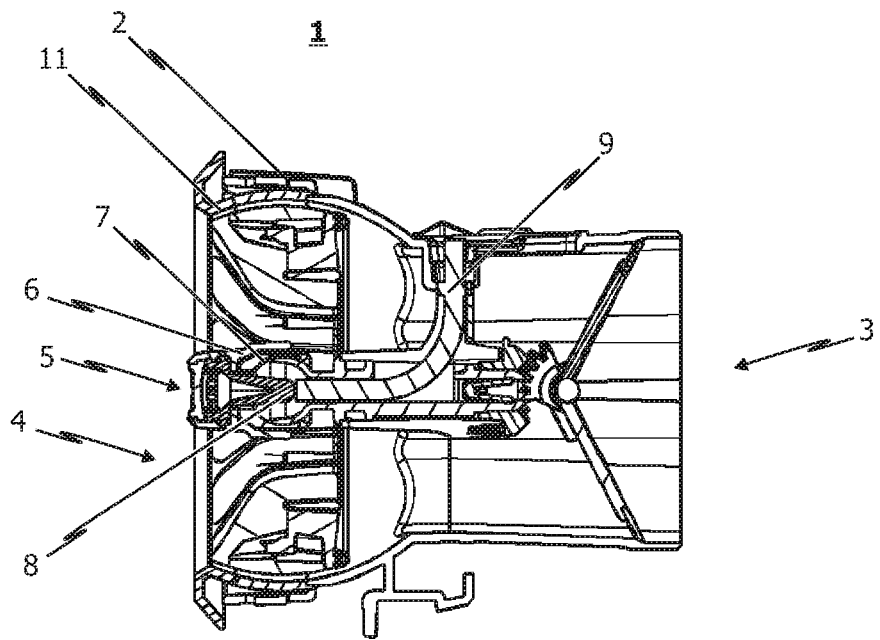
FIG. 6A schematically and in a longitudinal sectional view, a sixth exemplary embodiment of the air vent according to the invention.
Figure 6B:
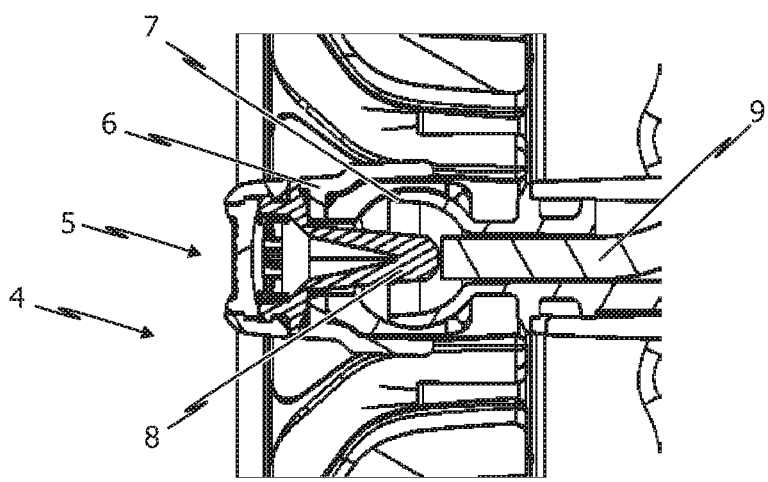
FIG. 6B schematically and in a longitudinal sectional view, a detail view of the sixth exemplary embodiment of the air vent according to the invention.

FIG. 6A shows, schematically and in a longitudinal sectional view, a sixth exemplary embodiment of the air vent 1 according to the invention, while a detailed view of the sixth exemplary embodiment of the air vent 1 according to the invention is shown in FIG. 6B.

The invention is not limited to the embodiments shown in the drawings, but rather results when all of the features disclosed herein are considered together.

LIST OF REFERENCE NUMERALS

1 Air vent
2 Housing
3 Air inlet region
4 Air outlet region
5 Insert
6 Element
7 Bearing system/bearing
8 First optical fiber
9 Second optical fiber
10 Carrier
11 Optical fiber system
12 Light source

The invention claimed is:

1. An air vent for a motor vehicle, wherein the air vent comprises:
a housing having an air inlet region and an air outlet region;
an insert rotationally and or pivotably supported in the housing about a bearing system with at least one assembly for guiding and/or deflecting a supplied air flow; and
an element arranged centrally in the insert, which element is connected to the at least one assembly for guiding and/or deflecting a supplied air flow;
wherein the bearing system is arranged on the central longitudinal axis of the housing, wherein the bearing system is carried out by means of a bearing, and wherein a first optical fiber is accommodated at least partially or regionally in the bearing such that the first optical fiber is rotatable, tiltable, and/or pivotable in the bearing relative to the housing together with the element arranged centrally in the insert,
wherein
for the at least regional lighting of the air vent, at least one light source is arranged in the housing on the central longitudinal axis thereof and—when viewed in the main flow direction of the air vent—upstream of the bearing system, such that the light emitted by the at least one light source is at least partially couplable, as needed, into the first optical fiber via a photometric coupling in the bearing.

2. The air vent according to claim 1,
wherein the at least one light source is associated with a second optical fiber, which extends along the central longitudinal axis of the housing and is guided into the bearing approximately at the pivot point of the insert, wherein the first optical fiber is guided into the bearing from the side opposite the second optical fiber, and wherein the light emitted by the at least one light source is at least partially coupled into the second optical fiber, and the second optical fiber then couples the light into the first optical fiber (8).

3. The air vent according to claim 2,
wherein the first optical fiber and the second optical fiber do not touch, but the first optical fiber is configured so as to be convex or concave at the light coupling site, wherein the second optical fiber is configured so as to be planar or even at the light outcoupling site.

4. The air vent according to claim 2,
wherein an optical element is arranged between the first optical fiber and the second optical fiber.

5. The air vent according to claim 1,
wherein the at least one light source is associated with an elongated hollow body for light shielding, which extends along the central longitudinal axis of the housing and is guided into the bearing approximately at the pivot point of the insert, wherein the light emitted by the at least one light source is at least partially coupled into the first optical fiber via the elongated hollow body.

6. The air vent according to claim 5,
wherein the first optical fiber and the elongated hollow body do not touch, but the first optical fiber is configured so as to be convex or concave at the light coupling site, wherein, between the elongated hollow body and the first optical fiber, an optical element in the form of a lens.

7. The air vent according to claim 1,
wherein the at least one light source is arranged on an elongated carrier, wherein the longitudinal axis of the carrier extends perpendicular to or substantially perpendicular to the main flow direction of the air vent, wherein an end region of the carrier facing away from the at least one light source is guided at least regionally out of the housing and comprises a plug-in contact for a power supply.

8. The air vent according to claim 7,
wherein conductor tracks are formed on the carrier (10), which galvanically connect the at least one light source (12) to the plug-in contact, wherein the conductor tracks themselves form contact surfaces of the plug-in contact.

9. The air vent according to claim 7,
wherein a slit opening is formed in the housing, into which the carrier can be inserted.

10. The air vent according to claim 7,
wherein at least one further light source is arranged on the carrier wherein the at least one further light source is associated with an optical fiber system, in which the light emitted as needed by the at least one further light source is at least partially couplable, wherein the optical fiber system comprises an annular region that at least regionally surrounds the insert of the air vent.

11. The air vent according to claim 1,
wherein the at least one light source is arranged on an elongated carrier, in the form of a printed circuit board, wherein the carrier runs at least partially obliquely to the main flow direction of the air vent within the housing, wherein an end region of the carrier facing away from the at least one light source is guided at least regionally out of the housing and comprises a plug-in contact for a power supply, and wherein an opposite end region of the carrier is arranged with the at least one light source—compared to the end region of the carrier with the plug-in contact—further downstream of the air vent.

12. The air vent according to the preamble of claim 1, wherein for the at least regional lighting of the air vent, at least one light source arranged on the housing, wherein the at least one light source is associated with a second optical fiber, which runs obliquely to the central longitudinal axis of the air vent such that the light emitted by the at least one light source is at least partially couplable into the second optical fiber and couplable by the latter into the first optical fiber.

13. The air vent according to claim 12,
wherein the second optical fiber is associated with an elongated hollow body for light shielding, which extends along the central longitudinal axis of the housing and is guided into the bearing approximately at the pivot point of the insert, wherein the light emitted by the at least one light source and coupled into the second optical fiber is at least partially coupled into the first optical fiber via the elongated hollow body.

14. The air vent according to claim 13,
wherein the first optical fiber and the elongated hollow body do not touch, but the first optical fiber is configured so as to be convex or concave at the light coupling site.

15. The air vent according to claim 13,
wherein an optical element is arranged between the elongated hollow body and the first and/or second optical fiber.

* * * * *